United States Patent [19]

Joy

[11] 3,763,702

[45] Oct. 9, 1973

[54] ENDS DOWN MONITORING

[75] Inventor: Raymond D. Joy, Clarksville, Va.

[73] Assignee: Burlington Industries, Inc., Greensboro, N.C.

[22] Filed: July 9, 1970

[21] Appl. No.: 53,624

[52] U.S. Cl. .................................. 73/160, 242/37
[51] Int. Cl. ..................... B65h 63/02, G08b 5/06
[58] Field of Search.................... 73/160, 159, 37.8, 73/37.7, 37.6; 242/38, 37, 29; 57/80, 81

[56] References Cited
UNITED STATES PATENTS

| | | | |
|---|---|---|---|
| 2,579,407 | 12/1951 | Turner..................................... | 57/81 |
| 2,611,230 | 9/1952 | Saunders et al. ..................... | 57/81 X |
| 2,734,334 | 2/1956 | Saunders et al............... | 242/37 R X |
| 3,413,794 | 12/1968 | Bell et al................................. | 57/80 |

FOREIGN PATENTS OR APPLICATIONS

| | | | |
|---|---|---|---|
| 1,290,192 | 3/1962 | France................................. | 73/160 |
| 815,256 | 6/1959 | Great Britain.......................... | 57/81 |
| 1,020,086 | 2/1966 | Great Britain.......................... | 57/81 |

*Primary Examiner*—Louis R. Prince
*Attorney*—Cushman, Darby and Cushman

[57] ABSTRACT

A pneumatic device, particularly for detecting an ends down condition on a spinning frame, having a piston member with a passageway connecting its rear to an enclosed region at its front and movable in a bore of a housing rearward against a spring when a low pressure signal is applied to the device and communicated to the enclosed region via the passageway. In one embodiment, the piston member grips a movable electrode in its rear position and, as it returns forward after the signal is removed, drags the electrode forward against a spring to connect it to a stationary electrode and produce an electrical pulse and further generates pneumatic pulses by its forward and rear movements. In another embodiment, a valve stem blocks a passageway venting a chamber to the atmosphere when the end is up so that pressure is communicated to the region at the front of the piston member which moves rearward away from a transparent bezel and when the end is down the chamber is vented and the piston member moves forward until the colored front of the piston member is visible through the bezel. In yet another embodiment, the yarn itself blocks the passageway. In another embodiment, the ends down detector includes a pivotable member which engages the yarn at one end and has a magnet mounted on its other end so that when the yarn comes down the magnet moves adjacent a reed switch which is closed thereby. In one system a number of such reed switches are each connected to a unique combination of data lines and a recorder for each switch is likewise connected to the lines. The recorder has a normally closed relay connected to those lines to which the associated switch is not connected and a normally open relay connected to those lines to which the associated switch is connected so that a current path is completed through a recorder relay via all of the relay switches only when the associated reed switch is closed. In another system, a number of pneumatic devices are connected to a common manifold so that a pneumatic signal travels both directions in the manifold toward devices for detecting the arrival of the signal. The time interval between the arrival of the signal at the first device and the arrival at the second indicates the position of the pneumatic device producing the signal and accordingly the particular device producing the signal. In one embodiment, the arrival of the signal at the first device causes a wheel to begin rotating and sequentially connecting to a number of fixed contacts. The arrival of the signal at the second device causes an electrical signal to be coupled to the fixed contact to which the wheel is connected at that time. In a second embodiment, the arrival of the signal at the first device causes a pneumatic logic to sequentially move through a number of stages so that the stage activated at the time of arrival at the second device indicates the pneumatic device which produced the signal.

12 Claims, 23 Drawing Figures

United States Patent [19]
Joy
[11] 3,763,702
[45] Oct. 9, 1973
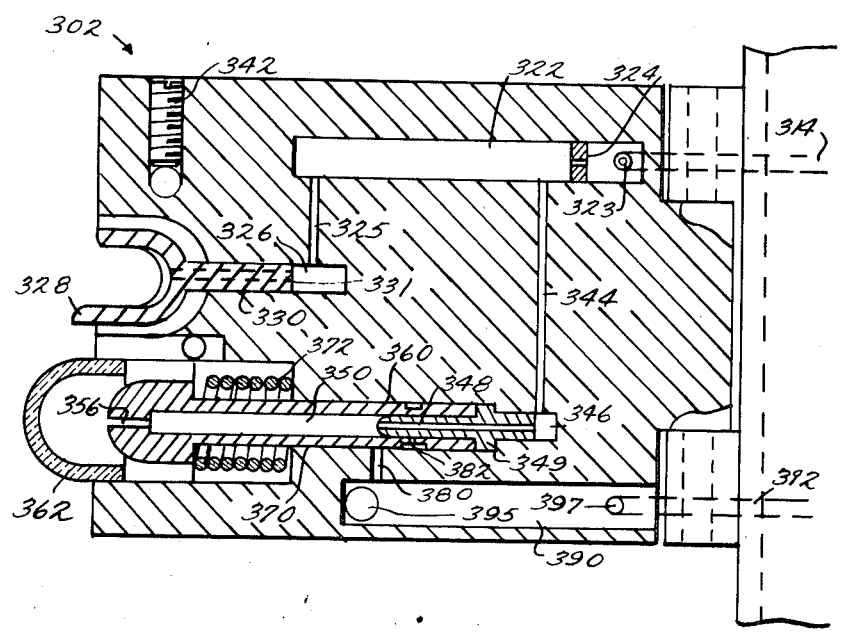

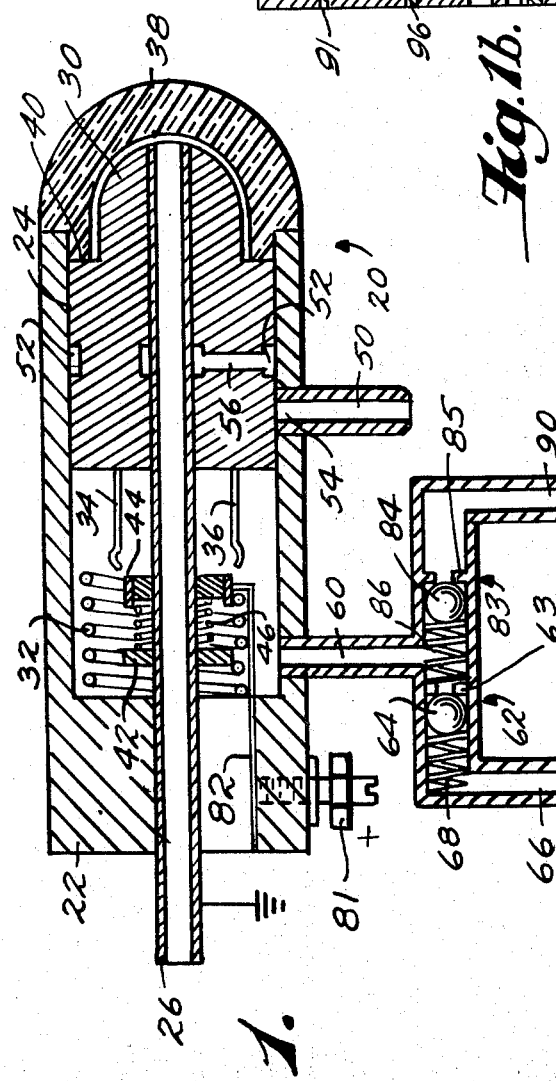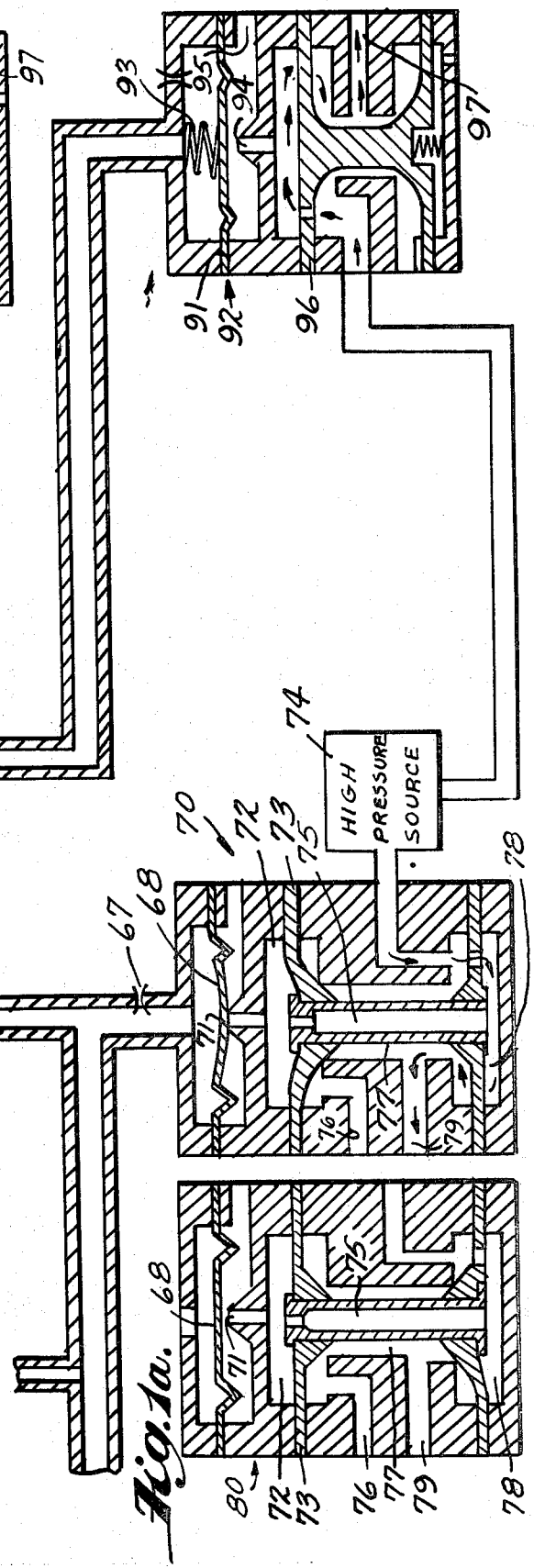

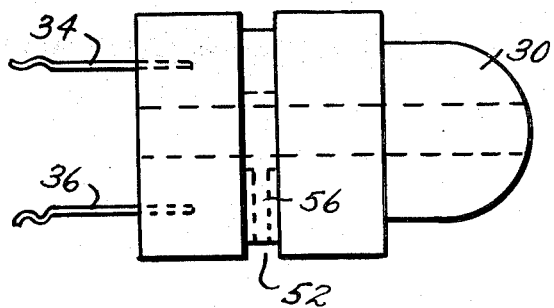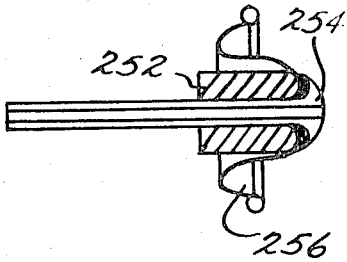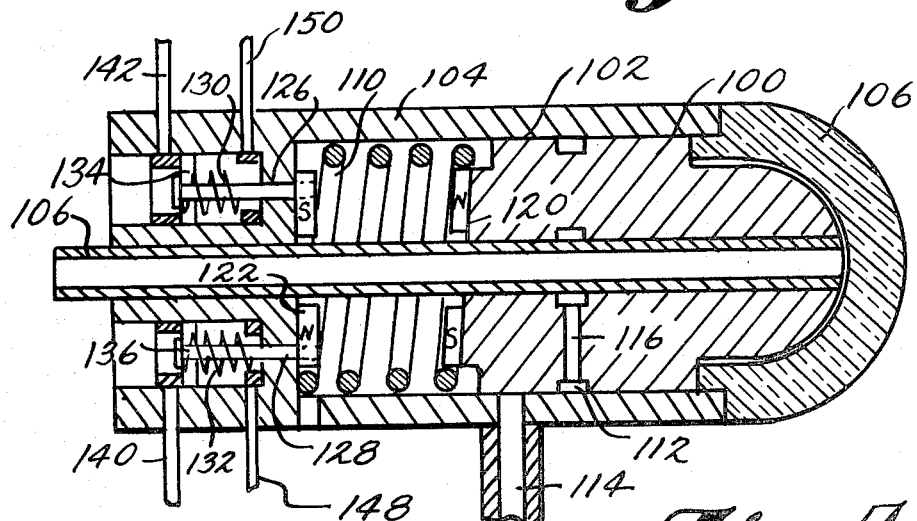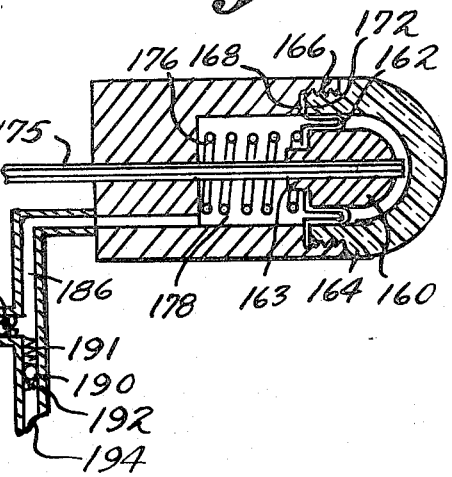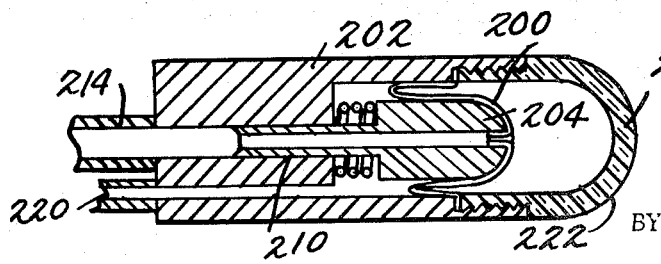

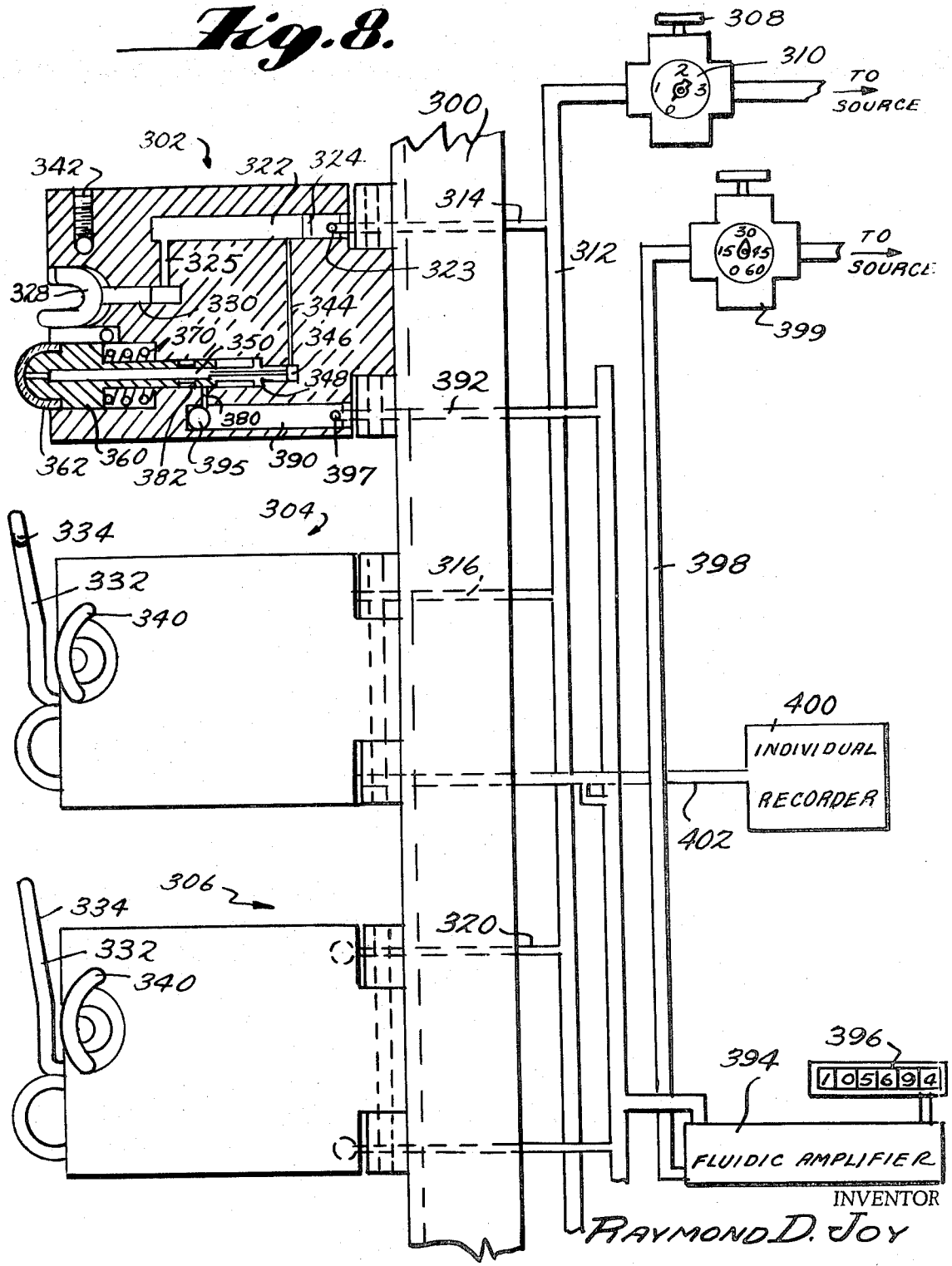

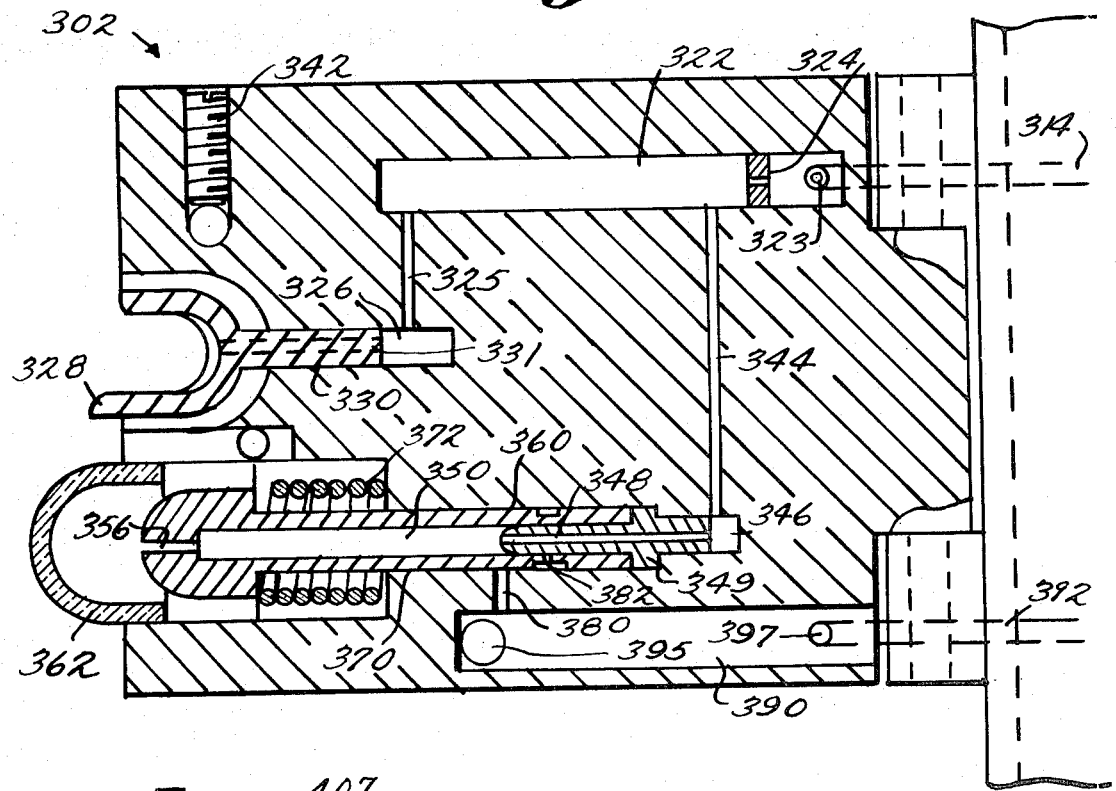
Fig. 9.
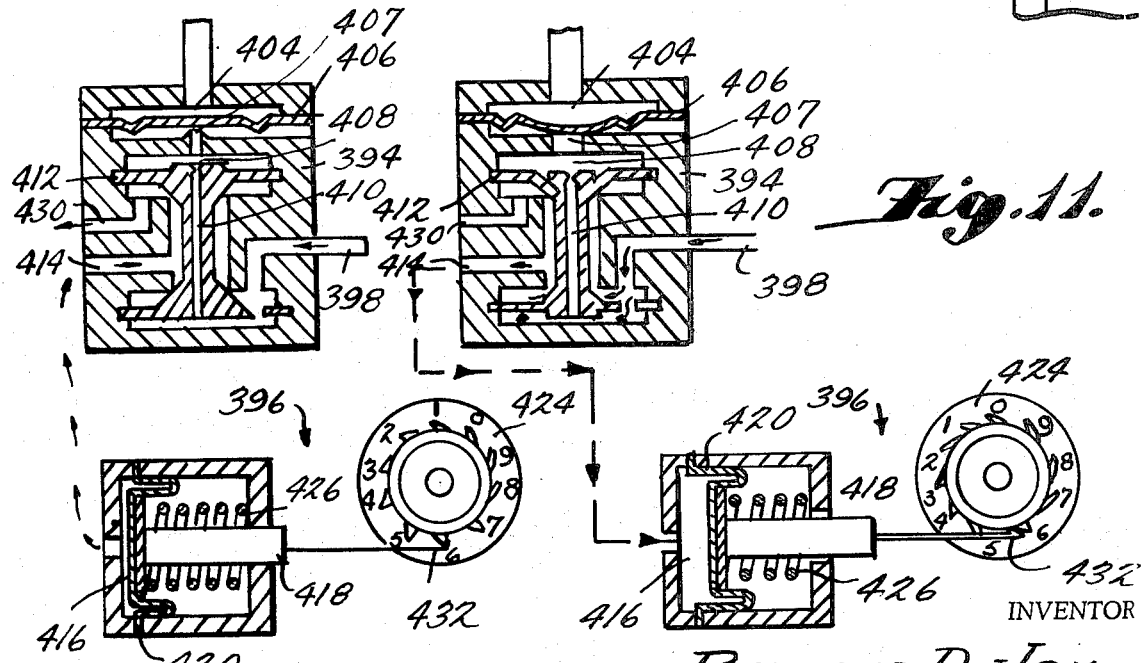
Fig. 11.
Fig. 12.
INVENTOR
RAYMOND D. JOY
BY Cushman, Darby & Cushman
ATTORNEYS

INVENTOR
RAYMOND D. JOY

INVENTOR
RAYMOND D. JOY
BY Cushman, Darby & Cushman
ATTORNEYS

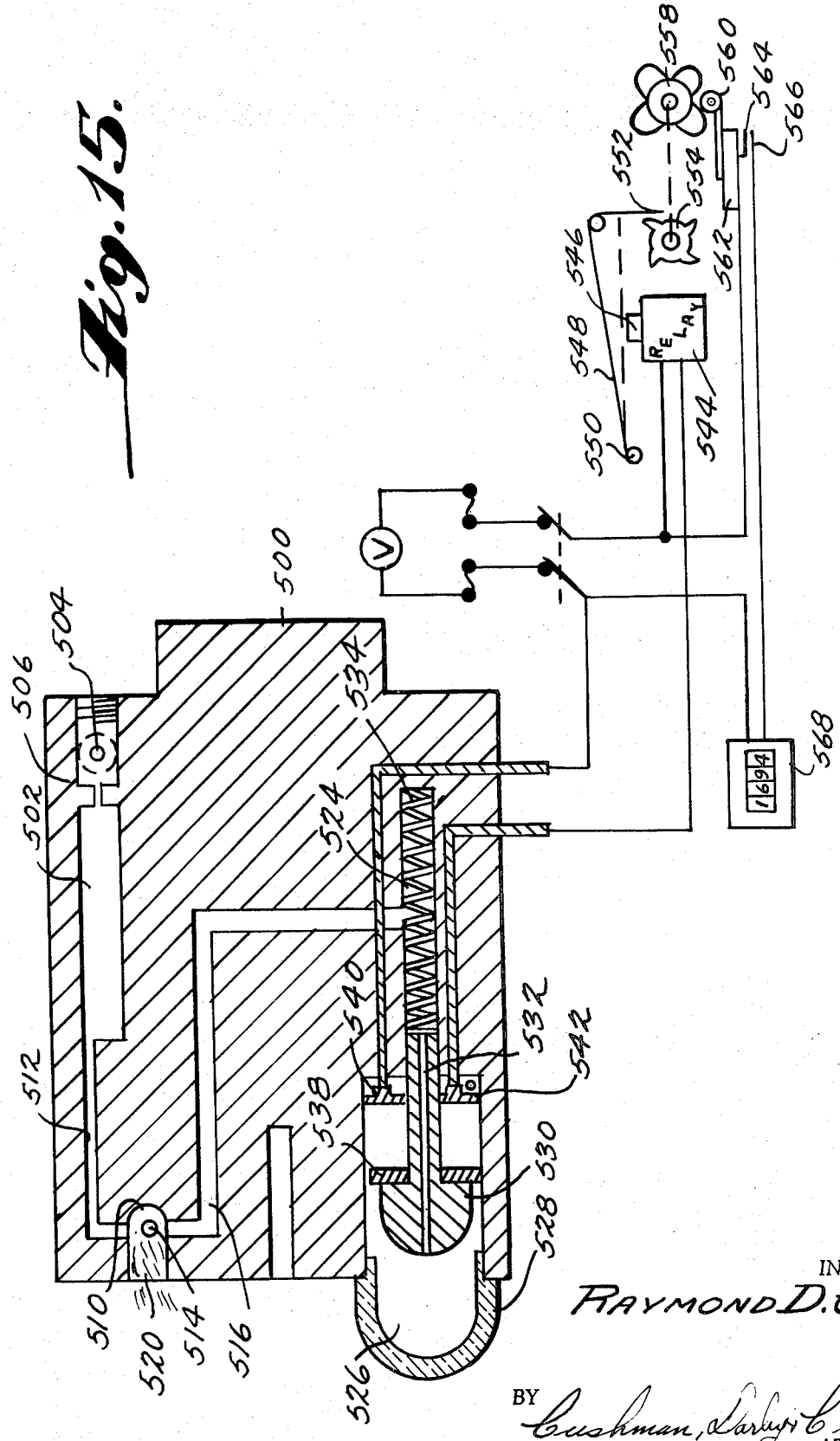

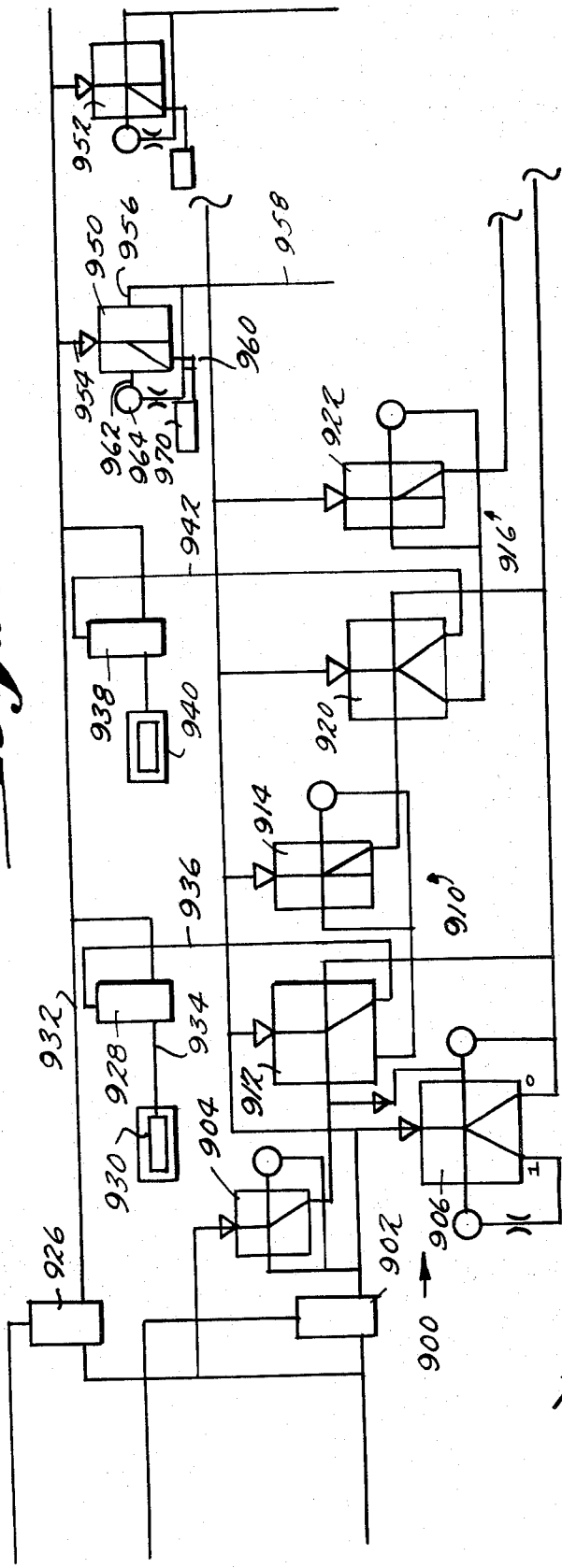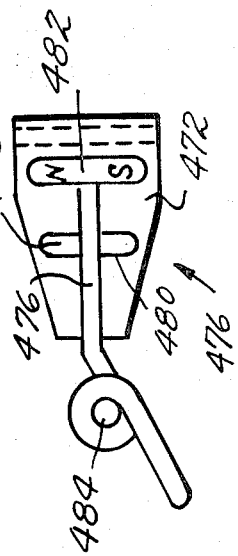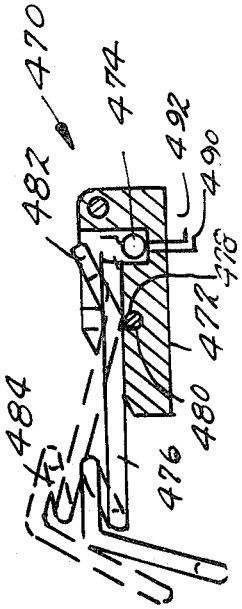

ENDS DOWN MONITORING

BRIEF DESCRIPTION OF THE PRIOR ART AND SUMMARY OF THE INVENTION

The invention relates to a low pressure operated pneumatic and electric pulsing device and to an ends down detecting and surveiller monitoring system.

Since fluidic devices which operate on the Coanda principle or Wall attachment effect devices which produce an output signal at very low pressure have become popular, the need for relatively simple devices that can be operated by such low pressure signals to obtain pneumatic and/or electrical pulse signals of relatively short duration in order to sense signal or register a sequence of events which may occur in relatively rapid successions has been evident.

The invention of this application as described below relates to such a simple fluidic device which incorporates a piston like member which operates against a low compression spring causing it to traverse into the bore of a housing to produce a pneumatic output signal of short duration, but sufficient intensity to operate an auxiliary device momentarily thus producing a pneumatic pulse. The device can be connected to produce a vacuum pulse momentarily as the piston member is released and moves in response to the forces generated by its compressed spring out of the bore. By attaching clipper springs or a magnet to the rear of the piston member, an electric switch can be implemented to produce a momentary contact and electrical signal upon removing the low pressure signal from the front of the piston, allowing the compressed spring to force the piston out of its bore and against the forward stop.

Such a device as described in detail below has a particular utility in the environment of a textile mill and particularly for detecting and monitoring an ends down condition on a spinning frame. Heretofore, it has been difficult to detect, flag, register, totalize or signal when an end of yarn or the like comes down on a spinning frame. One of the particular problems is that the detecting mechanism must necessarily be very sensitive and hence delicate in order to detect the end. Frequently, doffing or putting up an end destroys or insensitizes existing detectors and further the oily, humid and dirty atmosphere in which the detecting and signalling devices operate frequently render them useless after a short operating interval.

Accordingly, it has been discovered that the fluidic mechanism such as described above and in detail below is particularly suitable for sensing the presence of an end or thread of yarn being run or wound at a very high speed through the detecting device and producing a suitable signal for triggering auxiliary devices to spot the position of the end that is down and to also generate or close a switch or by some other means apply information to data collecting devices for further recording and reference.

Further, a system is described in detail below whereby a number of such penumatic devices which produce a signal in response to the detection of an ends down condition are connected to a common manifold having devices for detecting the arrival of the signal thus produced mounted at both of its ends. The time interval between the arrival of signal at the first device and the arrival of the signal at the second device indicates the position of the pneumatic ends down detector on the manifold, and accordingly indicates which detector is producing the signal at the two devices.

In one embodiment, the arrival of the signal at the first device causes a wheel to begin rotating and sequentially connect a contact mounted for rotation with the wheel to each of a plurality of fixed contacts. The arrival of the signal at the second device causes an electrical signal to be coupled to the fixed contact to which the wheel is connected at that time so that an electrical signal is passed to a recorder which is associated with the pneumatic device producing the signal. In a second embodiment, the arrival of the signal at the first device triggers a pneumatic oscillator which thereafter shifts between a first and second condition, each shift causing a different stage and the recorder associated with that stages to be activated. The stage which is activated when the signal arrives at the second device is the stage associated with the pneumatic device producing the signal, and accordingly the recorder thus operated records which of the pneumatic devices connected in common to the manifold produced the signal.

In a further embodiment, the detector comprises a pivotable member which engages the yarn at one end and has a magnet mounted on its other end so that the magnet moves adjacent a reed switch to cause it to close its contacts when the end comes down. In one system for use with such detectors, a number of reed switches are connected to a plurality of data lines with each switch being connected to a unique combination of those lines. Logic units each comprising a number of relays each connected to one of the data lines is associated with each reed switch, with those relays connected to a line to which the reed switch is not connected having a normally closed controlled switch and those relays connected to a line at the reed switch is connected having a normally open controlled switch so that a current path is produced through a recorder relay via all of the relay switches only when the associated reed switch is closed in response to the detection of an ends down condition.

Many other objects and purposes will become clear from the following detailed description of the drawings.

BRIEF DESCRIPTION OF THE DRAWINGS

FIG. 1 shows one embodiment of a fluidic device which responds to a flow pressure signal by producing a pneumatic pulse and which responds to the removal of that flow pressure signal by producing a vacuum pulse and an electrical signal.

FIG. 1a shows an unconnected amplifier in the position where no vacuum signal is being applied.

FIG. 1b shows a further unconnected amplifier also in a position where no vacuum signal is coupled to the input.

FIG. 2 shows a piston member for use in a switch such as shown in FIG. 1.

FIG. 3 shows another embodiment of the pneumatic device for generating a pneumatic and electrical pulse in response to a low pressure signal.

FIG. 4 shows another device for generating a pneumatic pulse in response to a low pressure input signal.

FIG. 5 shows a piston and diaphragm arrangement providing better sealing and more friction free operation.

FIG. 6 shows another embodiment similar to that of FIG. 5.

FIG. 7 shows a piston press-fitted onto a piston member.

FIG. 8 shows a plurality of ends down detecting units mounted on a spinning frame and connected to auxiliary components.

FIG. 9 shows a cut-away view of one of the units of FIG. 8.

FIG. 11 shows a cut-away view of an amplifier and counter receiving a pneumatic pulse.

FIG. 12 shows a cut-away view of the amplifier and counter of FIG. 11 while not receiving a pulse.

FIG. 15 shows a cut-away view of another ends down detector wherein the yarn blocks a passageway when present.

FIG. 16 shows an end down detector wherein the absence of yarn causes a magnet to be moved adjacent and to close a reed switch.

FIG. 17 shows a top view of the detector of FIG. 16.

FIG. 22 shows yet another system for determining which of a number of pneumatic detectors connected to a common manifold has produced a signal.

DETAILED DESCRIPTION OF THE DRAWINGS

Figure 21:
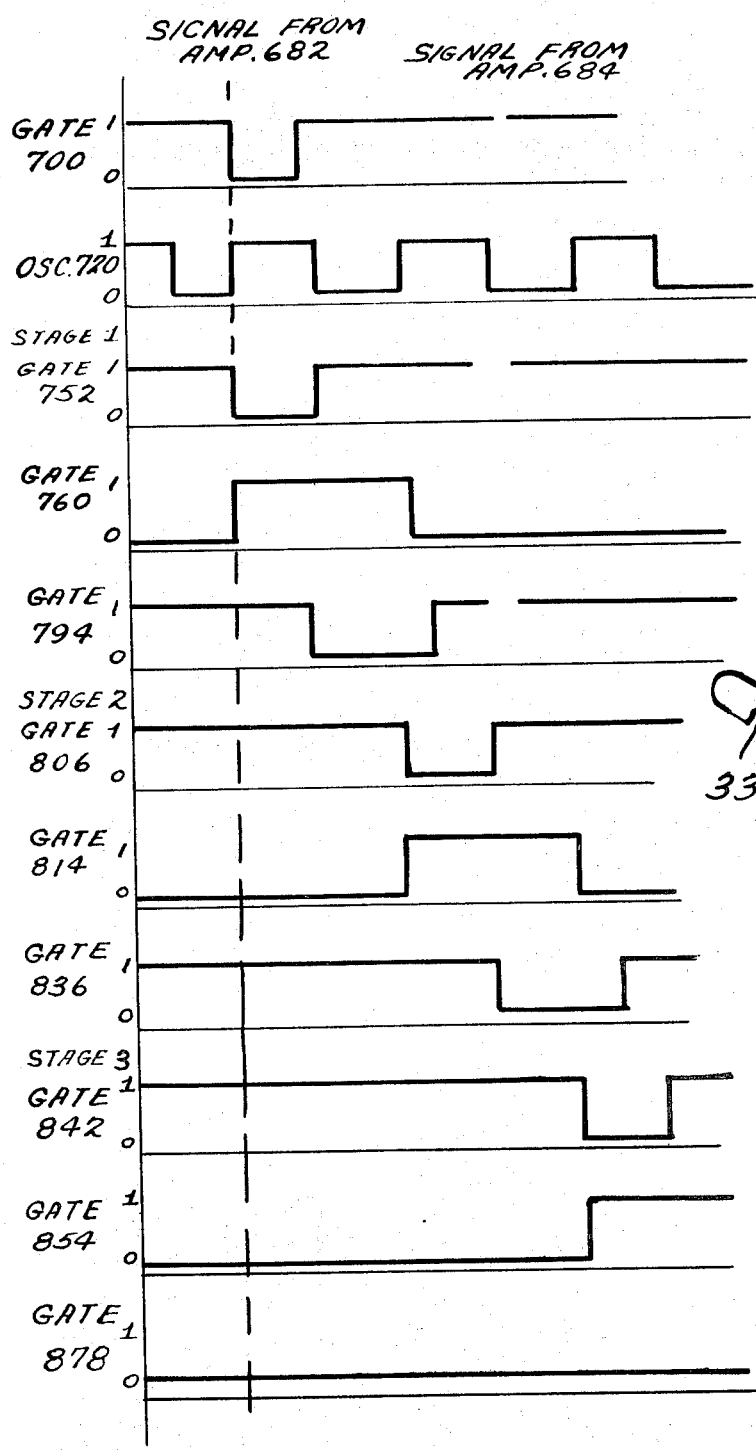
FIG. 21 shows a timing chart for the logic of FIG. 20.

Reference is now made to FIG. 1 which shows one embodiment of this invention which responds to a low pressure input signal by producing a pneumatic pulse and responds to the removal of that signal by producing a vacuum pulse and an electrical pulse which can then be passed to ancillary devices and used as desired. The simple unit 20, illustrated in FIG. 1, includes a housing 22 having a bore 24 in it. An electrically conductive air supply tube 26, which connects to the input device which supplies the low pressure signal, runs through the center of bore 24 and extends through the otherwise solid rear of housing 22. Tube 26 is open at both ends as shown.

An operating piston member 30, which can be seen best in FIG. 2, is likewise disposed in bore 24 and is free to slide along both tube 26 and bore 24 toward and away from spring 32. Two gripper springs 34 and 36 are fixed permanently to the rear of piston member 30 and a bezel 38 is press-fitted into bore 24 and shouldered against the outside and front end of housing 22 as shown. Bezel 38 provides a stop for the piston member 30 against its shoulder 40.

At the rear of the bore 24, a movable electrical contact 42 capable of moving along tube 26 and a stationary electrical contact 44 fixed in place are both provided for generating an electrical pulse when the low pressure signal applied to tube 26 is removed as discussed in detail below. Spring 32 is fitted against the rear of bore 24 so as to urge piston member 30 toward bezel 38 after it has compressed spring 32 in moving rearward in response to a low pressure signal. A second spring 46 is provided between contacts 44 and 42 and spring 46 continuously urges movable contact 42 rearwards, away from stationary contact 44.

When a low pressure pneumatic signal is applied to tube 26, for example in response to the opening of a valve, the closing of a switch, operation of a proximity fluidic sensor or other similar device, the pressure resulting from the signal thus applied builds up between the inside face of the bezel 38 and the outside face of piston member 30. When the force urging piston member 30 rearward which results from this pressure buildup exceeds the small frictional force between the surface of piston member 30 and bore 24, piston member 30 moves rearward in bore 24 toward spring 32, eventually compressing it until the force exerted by spring 32 on piston member 30 balances the force exerted by the pressure generated by the low pressure signal. Spring 32 is compressed sufficiently so that the gripper springs 34 and 36 grip movable electrical contact 42.

As the piston member 30 moves rearward in bore 24, output line 50 is momentarily connected to tube 26 via groove 52 of piston member 30 which is momentarily aligned with the open end 54 of output line 50. A bore 56, which can also be seen in FIG. 2, connects groove 52 to tube 26. Thus, a single positive pneumatic pulse is produced for each rearward movement of piston 30 in response to a low pressure pneumatic signal and this pulse can be transmitted to any appropriate device for recording the presence of the low pressure signal on tube 26 or employing that pulse in any suitable fashion.

Further, as piston member 30 moves rearward toward spring 32, a slight pressure builds up at the rear of piston member 30 in the enclosed portion of bore 24. That pressure is communicated through output line 60 to ball valve 62, causing ball member 64 to move away from its seat 63 which seals line 66, compressing sprong 68 and thus pneumatically connecting line 66 to line 60 and transmitting the relatively high pressure pneumatic pulse created by the rear movement of piston member 30 to line 66. A conventional restrictor 67 is provided in line 66 to limit the amplitude of the high pressure pulse transmitted.

The pressure signal communicated to line 66 causes pilot diaphragm 68 in a conventional amplifier valve 70 to move to the position shown, closing aperture 71. Pressure now builds up in region 72 behind spool diaphragm 73 since region 72 is connected to source 74 via inlet 75. This pressure builds up causes diaphragm 73 to shift to the illustrated position disconnecting exhaust line 76 from line 77 and connecting line 77 to line 78 which is connected to source 74 so that air flows from source 74 to line 77 and out outlet 79 as indicated by the arrows to a device which then employs the amplified pneumatic signal as desired. An unconnected amplifier 80 is also shown in FIG. 1a in the condition where no signal is being applied and when ball 64 returns to close seat 63, by either the forward movement of piston member 30 or the dissipation of the pressure behind member 30 via restrictor 67, diaphragms 68 and 73 return to the positions illustrated in amplifier 80. Other devices can of course be connected to line 66 to use the signal generated by the opening of valve 62 in any suitable way.

Thus upon the application of a relatively low pressure signal to tube 26, piston member 30 moves rearward compressing signal 32 at least until gripper members 36 and 38 have gripped stationary contact 42 and piston member 30 remains in this position until the low pressure signal is removed from line 26. When this occurs and the pressure on the outer face of the piston member 30 adjacent bezel 38 no longer exceeds the force exerted by spring 32 urging piston member 30 toward bezel 38, piston member 30 moves toward bezel 38, dragging movable contact 42 held by gripper springs 34 and 36 with it. When movable member 42 contacts stationary member 44, an electrical circuit is completed between contact 81 on the exterior of unit 20 and ground via tube 26, which is connected to ground as shown, stationary contact 44, movable contact 42 and line 82. Contact 81 is preferably connected to a solenoid, transistor or other device for detecting and recording the pulse generated by the connection of contact 81 to ground. After momentary electrical connection, stationary contact 44 and movable contact 42 separate as piston member 30 continues moving toward bezel 38 under the influence of spring 32 and gripper members 34 and 36 release stationary contact 42 which then moves rearwardly away from stationary contact 44 to its illustrated position under the influence of spring 42. Thus, the removal of the low pressure signal from the tube 26 generates a detectable electrical pulse which can be used in any way desired to record or respond to the removal of pressure from tube 26.

Further, as piston member 30 moves back toward bezel 38, the reduced pressure in bore 24 behind member 30 creates a reduced pressure in line 62 to which ball valve 83 corresponds as ball 84 moves away from valve seat 85 against spring 86 thus connecting line 90 to line 60. The resulting reduction of pressure in line 90 causes pilot diaphragm 91 in amplifier 92 to shift upwards against spring 93 to the position illustrated uncovering aperture 94. Aperture 94 now connects source 74 to exhaust 95, relieving the pressure above spool diaphragm 96 which moves upward to the position illustrated connecting output 97 to source 74 and thus generating a high pressure signal which can then be passed to other devices and employed as desired. An unconnected amplifier 98 is shown in FIG. 1b in the position where no vacuum signal is coupled to its input.

FIG. 3 illustrates an embodiment of the invention similar to FIG. 1 whereby a piston member 100 is mounted for free movement in a bore 102 of a housing member 104 having an input tube 106 extending through its center as shown. As in the embodiment of FIG. 1, the application of a low pressure signal to tube 106 causes a pressure to build up between the interior surface of bezel 106 and the exterior of piston member 100 which causes piston member 100 to move toward spring 110 which then generates a force urging piston member 100 toward bezel 108. When groove 112 of member 100 is aligned with output line 114, bore 116 in piston member 100 connects tube 106 to line 114 so that a low pressure pulse is generated on output line 114 which can be conveyed to any suitable device for recording or other use. However, in contrast to the arrangement illustrated in FIG. 1, in FIG. 3 instead of using grippers a permanent magnet 120 is permanently mounted on the rear of piston member 100 as shown and interacts with a second permanent magnet 122 which is movable within bore 102. Magnet 122 is connected as shown to members 126 and 128 which are urged respectively away from bezel 108 by conventional compression springs 130 and 132 and members 126 and 128 terminate in movable electrical contacts 134 and 136, respectively.

When the piston member 100 is in the position shown before a low pressure signal is applied to tube 106, lines 140 and 142 are electrically connected together by contacts 134 and 136. When piston member 100 moves rearward upon the application of a suitable low pressure signal to tube 106, magnets 120 and 122 move into close physical juxtaposition so that, when the low pressure is removed from tube 106, and piston member 100 begins to move back toward bezel 108 under the influence of spring 110, magnet 120 pulls magnet 122 with it against the force generated by springs 126 and 128, thus disconnecting line 140 from line 142 and momentarily thereafter connecting lines 148 and 150 via contacts 134 and 136. Eventually, member 100 moves far enough toward bezel 108 so that the spring forces overcome the magnetic attraction of magnets 120 and 122 or contacts 134 and 136 can move no further. At that time magnet 122 is released and the electrical connection between lines 148 and 150 is broken. Members 126 and 128 as well as contacts 134 and 136 now return to their illustrated positions under the influence of springs 126 and 128, electrically reconnecting lines 140 and 142 together. In this fashion, an electrical signal is generated which indicates the removal of the low pressure source from tube 106 and this electrical signal can be used in any fashion to respond to or record such removal.

FIG. 4 shows another embodiment of the invention somewhat similar to that of FIGS. 1 and 3 whereby a piston member 160 is provided with a boot-type diaphragm 162 which is stretch fitted over a small diameter projection 163 of piston member 160 and is clamped at its outer diameter by a screw-in type bezel 164 by threads 166. Diaphragm 162 is thus clamped between shoulder 168 of housing member 170 and bezel shoulder 172 thus providing much freer movement of piston 160 with less pressure loss.

As in the other embodiments, the application of a low pressure signal to line 175 causes piston member 160 to move rearward against the urging of compression spring 176. The pressure building up behind piston member 160 within chamber 178 as the piston member 160 moves rearward causes ball valve member 180 to be displaced against spring 182 and thus connect line 184 to line 186 and generate a low pressure pneumatic pulse which can be conveyed to conventional devices to record or respond to the application of a low pressure signal on line 184 as desired. After the low pressure signal is removed from line 175 and piston member 160 begins to move back toward bezel 164, the resulting reduced pressure in chamber 178 causes ball member 190 to be displaced upward against spring 191 thus unsealing valve seat 192 and connecting output line 194 to line 186 to produce a momentary pneumatic pulse upon the removal of the low pressure source from line 175.

FIGS. 5 and 6 illustrate an arrangement which is similar to that of FIG. 4 but which is provided with a diaphragm somewhat differently connected to provide better sealing and less friction. In FIG. 5, a molded diaphragm 200 is fitted to housing 202 at its outer diameter in the same fashion as discussed above with regard to FIG. 4. Molded diaphragm 200 fits over the front of piston 204 as shown and is preferably fastened to it by a metal orifice cut in flanged plug which provides a leak-proof seal. Piston 204 further has an integral small diameter extension 210 which is fitted into bore 212 for the purpose of receiving a low pressure signal from tube 214 which receives the low pressure signal in the same way as described above with the other embodiment. Thus, a relatively high pressure signal results on output line 220 as piston 204 moves away from bezel 222 in response to the application of a low pressure signal to tube 214. Similarly when piston 204 moves back towards bezel 222 under the urging of spring 210 in response to the removal of the low pressure signal, a vacuum signal results in line 220.

In the embodiment of FIG. 5, diaphragm 200 is fitted to housing 202 in the same manner as described above with regard to FIG. 4 and is preferably fastened to piston member 204 by a flanged plug which provides a leak-proof seal. FIG. 6 shows piston 204 in its position when a low pressure signal is being applied to line 214.

FIG. 7 shows a cut-away view of a typical piston 252 such as shown in FIGS. 5 and 6 press-fitted onto a flanged head tube 254 which clamps a flexible diaphragm 256 between the flange and the flanged end of tube 254. Such an arrangement provides a complete pulsing piston that will perform satisfactorily in the embodiments of FIGS. 5 and 6.

As pointed out briefly aboee, the unique device described in FIGS. 1-7 is particularly useful in conjunction with fludic sensing devices where low pressure signals are frequently generated and it is necessary or desirable to record or respond to the presence of these low pressure signals. Further while the embodiments shown in FIGS. 1-7, as well as devices of FIGS. 8-15, can be of course used in conjunction with other devices, they have particularly utility in the environment of a textile mill and more particularly for sensing and detecting an ends down condition on a spinning frame. While the following description is directed to the use of such devices in this particular environment, it will of course be understood that the novel invention of this application is not limited to that important application.

Reference is now made to FIGS. 8 and 9 which show respectively a plurality of pneumatic sensing devices of the type described above in FIGS. 1-7 mounted on a thread board for sensing an ends down condition and a cut-away view of one such sensor. While only three sensors are shown attached to a conventional thread board 300 in FIG. 8, it will of course be understood that any number of such sensors can be provided in any particular enivornment such as a spinning frame, each associated with a thread or yarn for detecting the end of that thread. As with existing sensor devices, each unit is preferably attached by a hinge to the thread board as shown to permit individual raising of each unit for maintenance and replacement as necessary. Similarly, the thread board preferably fastens to lifter rods so as to facilitate raising groups of sensors for the purpose of dropping full bobbins and installing new ones.

A source of air under pressure is connected to each of the units 302, 304 and 306 illustrated in FIG. 8 through a conventional pressure regulating valve 308 which produces a continuous low pressure signal in the range of 1 to 5 psi which is preferably shown on gauge 310 as illustrated in FIG. 8. A suppy manifold line 312 transmits this pressure signal to the individual supply lines 314, 316 and 320 which individually connect to the units 302, 304 and 306, respectively.

Reference is now made to FIG. 9 which shows a detailed cut-away view of sensor 302 from which the operation of that sensor and the other sensors should be readily apparent. The pressure signal from the valve 308 is conveyed into unit 302 via supply line 314 and the air enters a receiving chamber 322 in unit 302 via a supply port 323 and a flow restrictor 324 which precludes a substantial pressure drop in line 312 which might keep other units from operating properly. Even with 119 units venting, if the 120th needs to operate, the system shown will supply sufficient pressure for it to do so. Flow restrictor 324 is preferably a calibrated orifice having a bore carefully chosen to restrict the fluid flow to whatever extent is necessary.

Figure 10:
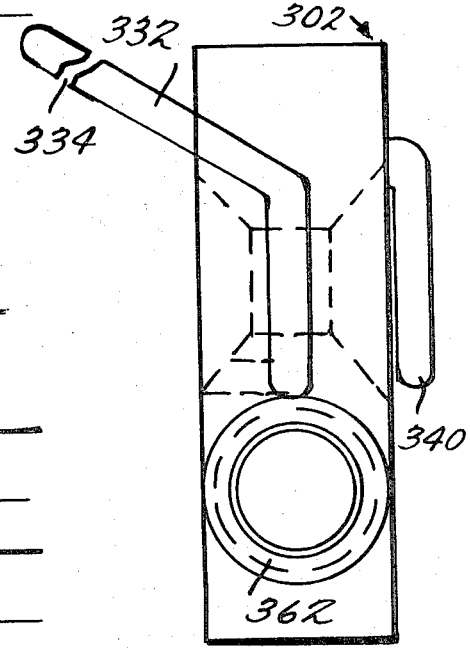
FIG. 10 shows a front view of one of the units of FIG. 8.

As can be seen in FIG. 9, chamber 322 is connected to the atmosphere via passages 325 and 326. However, a sensor yoke member 328 is disposed in the opening of passage 326 into the atmosphere. Sensor yoke 328 is provided with a rearwardly extending hollow valve stem 330 which blocks the connection between passages 326 and 324 when the yoke 328 is forced backwards from its illustrated position into unit 302 and vents chamber 322 to the atmosphere via passage 331 when in its illustrated position. As can be seen in FIG. 8 in connection with the unit 304, a pigtail member 332 is disposed about the yoke 328 and is preferably provided with a slubbing slot 334. The yarn end does not thread through slubbing slot 334, but rather the yarn is threaded behind member 332 and in back of holder 340. When any unusually heavy slub in the yarn passes from between the front rolls, the yarn ends breaks due to the centrifugal force of the end being spun and is thrown around pigtail guides 332, thereby catching the slub in slot 334, thus breaking the slub out of the yarn end. When yarn is so threaded, pigtail member 332 is positioned as shown in FIG. 10 so as to force the stem 330 of yoke 328 into unit 302, and to thus normally block the connection between passages 325 and 326. Pigtail member 332 is shown removed from unit 304 for greater clarity in illustration. As can be best seen in connection with unit 302 in FIG. 10, a thread holder 340 is preferably provided on unit 304, as well as the other units, and is held in place by a set screw 342. The purpose of the thread holder 340 is to keep the yarn end from being thrown out when doffing, starting up or when a heavy slub comes through.

When yarn is present and accordingly yoke stem 330 is forced inward to block the connection between passages 325 and 326, pressure builds up in chamber 322 and is transmitted through passage 344 into chamber 346. This pressure is further communicated through passage 348 in fixed member 345 into passage 350 which runs through piston member 360 which is free to move within bore 370. Passage 350 connects to passage 356 which in turn terminates in the region between the front of piston 360 and bezel 362. This pressure forces piston 360 which is, as are the pistons in the other embodiment, freely movable within bore 370 rearwards against and compressing sprnng 372 as shown.

Thus, when stem 330 blocks the outlet of passage 325, as in the case when the yarn presence is sensed, piston member 360 is in its illustrated rear position with the front thereof withdrawn from initmate contact with transparent bezel 362. Preferably the front portion of piston member 360 which contacts bezel 362 is colored red or some other suitable color so that it is readily observable to denote a flag condition after it moves forward into contact with bezel 362 under the urging of spring 372 and in response to the removal of pressure from chamber 346 which takes place in response to the venting of chamber 322 to the atmosphere via passages 325 and 326.

Thus, when an ends down condition occurs, piston member 360 moves forward from its illustrated position until its front potion contacts bezel 362 and the red or other color of that portion is readily visible through transparent bezel 362. Similarly, when a new yarn has been placed through the slot of the associated pigtail, the piston member then returns to its illustrated position. As piston member 360 moves rearward from its forward position against spring 372, passage 380 is momentarily connected to passage 350 via an opening 382 in piston 360 so that a low pressure pulse is thus transmitted to chamber 390 and out individual line 392 to a fluidic amplifier 394 and a suitable and conventional pneumatic counter 396. A ball 392 is disposed in chamber 390 so that when unit 302 is lifted for maintenance or for any other reason, ball 395 rolls to a position blocking port 397 which connects chamber 390 to line 392 and thus preventing production of a false signal during the time unit 302 is in the lifted position. The low pressure pulse recorded on counter 396 thus indicates a return to normal condition of one of the sensor units 302, 304 or 306 which are all similarly connected to amplifier 394. Amplifier 394 is supplied with pressure from a suitable source via valve and gauge 399 and line 398.

While counter 396 records the total number of ends down on all units together, recorders such as counter, relays, tap puncher or other encoders can be associated, if desired, with each unit to record the number of low pressure pneumatic pulses produced by that unit and hence the number of ends down conditions detected by that unit. To illustrate one such arrangement conventional recorder 400 in FIG. 8 is shown connected to line 402 for receiving and detecting each low pressure pulse produced by unit 304.

FIGS. 11 and 12 show respectively a cut-away view of amplifier 394 and counter 396 in position receiving a pneumatic low pressure pulse from one of the units such as unit 302 and in position not receiving a pulse. Amplifier 394 operates similarly to amplifier 70 of FIG. 1 and reference should be made to the discussion of amplifier 70 above for a detailed description of the operation of this type of amplifier.

Briefly, the arrival of the pneumatic pulse in chamber 404 causes pilot diaphragm 406 to shift from the position illustrated in FIG. 12 to the position of FIG. 11, blocking aperture 407. Pressure now builds up in chamber 408 which is connected to line 398 via passage 410 through the middle of spool diaphragm 412. Line 398 connects to a pressure source via gauge and valve 399 as shown in FIG. 8. This pressure in chamber 408 forces spool diaphragm 412 downward connecting passage 414 to line 398.

Passage 414 is connected to chamber 416 which is located behind piston 418 in counter 396. A flexible diaphragm 420 seals chamber 416 and permits movement of piston 418. Thus, as spool diaphragm 412 moves downward and connects passage 414 to line 398, pressure builds up in chamber 416 forcing piston 418 to move toward ratchet wheel 424 and to compress spring 426. When the low pressure pneumatic signal ends, pilot diaphragm 407 and spool diaphragm 412 shift back to the positions illustrated in FIG. 12, connecting chamber 416 to the atmosphere via passage 430. Spring 426 now forces piston 418 back to the position shown in FIG. 12. At the same time, hook 432, which has engaged one of the teeth on ratchet wheel 424, rotates wheel 424 through an angle which then represents a count of one ends down condition.

Figure 13:
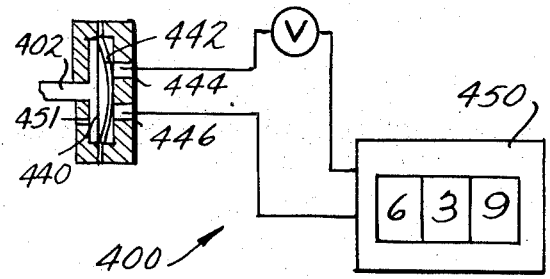
FIG. 13 shows another amplifier and counter.
Figure 14:
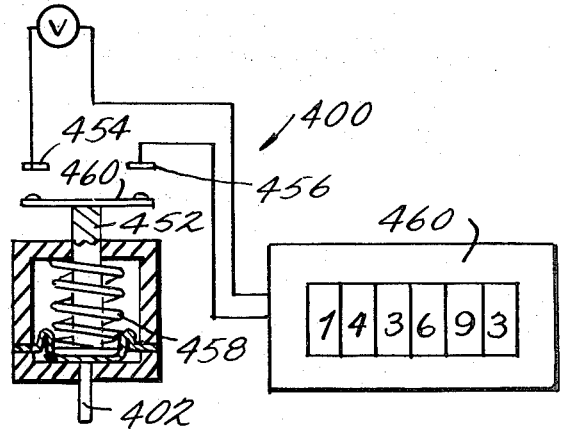
FIG. 14 shows yet another amplifier and counter.

FIGS. 13 and 14 depict two other suitable pneumatic amplifiers and counters. While these arrangements are discussed specifically in reference to the individual recorder 400, it will, of course, be apparent that they can also be employed in place of amplifier 394 and counter 396 if desired. In FIG. 13, the pneumatic pulse received on line 402 causes pressure to build up in chamber 440 behind flexible diaphragms 442 which responds by bowing toward electrical contacts 444 and 446. A quantity of mercury which is not normally sufficient to connect together contacts 444 and 446 is stored in the region behind diaphragm 442 and, as diaphragm 442 bows, this mercury is forced into the space adjacent contacts 444 and 446 to electrically connect these contacts together, and permit current to flow through conventional counter 450 which thus records the detection of an ends down condition. When the pulse is removed, vent 451 bleeds the pulse pressure to the atmosphere, diaphragm 442 moves back to its initial position and the connection between contacts 444 and 446 is broken.

In FIG. 14, the pneumatic pulse forces piston 452 to move toward contacts 454 and 456 against the urging of spring 458 until bar 460 electrically connects contacts 454 and 456 so current flows to conventional electrical counter 460 to record the detected ends down condition. When the pneumatic pulse is removed spring 458 forces piston 452 back to its illustrated position, breaking the connection between contacts 454 and 456.

Reference is now made to FIG. 15 which shows a sensing unit 500 similar to unit 302 illustrated in FIG. 9. However, in contrast to the embodiment of FIG. 9, unit 500 employs no sensor yoke or valve stem. The yarn itself serves to block a passageway connecting a receiving chamber to the front of a piston so that when the yarn end comes down the pressure in the receiving chamber is communicated through a hollow passageway in the piston to the region between the inside of the bezel and the front of the piston so that the piston moves rearward to electrically connect together two contacts and indicate an ends down condition. Thus, the rear position of the piston member away from the bezel indicates the presence of an ends down condition, while its forward position pressed against the inside face of the bezel denotes a normal condition.

As in the embodiment of FIGS. 8 and 9, a suitable source of pressure is connected to a receiving chamber 502 in unit 500 via a suitable valve (not shown), an inlet aperture 504 and a restriction valve 506. Chamber 502 is connected to a second chamber 510 via line 512, as shown, and when a yarn such as yarn 514 is disposed in chamber 510, as shown, yarn 514 blocks communication between passages 512 and 516 so that most of the air vents to the atmosphere via exhaust 520. However, when the yarn end comes down, a substantial portion of the air moving from the passage 512 into chamber 510 passes into passage 516 which empties into chamber 524. Chamber 524 communitcates via passage 532, through the middle of piston member 530, with the interior region 526 between the inside face of the bezel 528 and the front of piston member 530. The resulting pressure build up in region 526 forces piston 530 backward, compressing spring 534 within chamber 524. Piston 530 is illustrated about half way between its forward and rear position.

Eventually the pressure in chamber 526 forces piston 530 back to the point where ring 538 contacts electrical connections 540 and 542. In this position, piston 530 can move no further to the rear, and electrical connections 540 and 542 remain connected together by ring 538, thus completing a current path through relay 544. Relay 544 responds to the passage of current through it by shifting solenoid lever 546 so as to cause member 548 to pivot about a pin 550 from the position roughly shown in dashed lines to the position shown in solid. Member 548 includes a hook 552 on its lower portion, and hook 552 engages a tooth on ratchet 554 so that its rotational movement of member 548 about pin 550 rotates ratchet wheel 550 to the position illustrated.

Ratchet wheel 554 is mounted for rotation with a second wheel 558, for example, on the same shaft, so that the rotation of ratchet wheel 554 rotates wheel 558 which is provided with a number of cam members. The rotation of wheel 558 forces cam follower member 560 to rotate about pivot point 562 and force contacts 564 and 566 into momentary connection thus generating a pulse of current which is applied to conventional electrical counter of 568 to record the detected ends down condition.

When the yarn is replaced in chamber 510, the pneumatic connection between passages 512 and 516 is interrupted with the result that the pressure built up between the inside face of bezel 528 and the front portion of piston 530 is dissipated so that piston member 530 returns to its former position under the urging of spring 534, in preparation for the next detection of an ends down condition.

FIGS. 16 and 17 illustrate another simple ends down detector. As with the embodiment of FIG. 8, a number of such detectors will normally be pivotably mounted on a thread board, but, for clarity, only one detector 470 is shown in FIGS. 16 and 17. Detector 470, however, in contrast to the other embodiments discussed above, does not generate a pneumatic pulse in response to an ends down detection, but instead generates an electrical one. In the embodiment of FIGS. 16 and 17, this is accomplished by providing a magnet on one end of a pigtail guide so that when the end comes down the magnet moves adjacent a reed or similar switch to generate an electrical signal.

Mounting block 472 is grooved as shown to accomodate a stationary conventional reed or similar switch 474 and rotatable pigtail guide and slubber 476. Guide 476 is attached to a rotatable member 478 which is lodged in groove 480 as shown so that guide 476 is pivotable about its point of attachment to member 478. Further, magnet 482 is mounted on the short end of guide 476 so that when no yarn is in eye 484, guide 476 shifts to the position shown in dashed lines in FIG. 16 with magnet 482 adjacent reed switch 474. When magnet 482 is so positioned, the contacts in switch 474 are closed and this condition can be easily detected by applying an appropriate electrical signal to lines 490 and 492 which each connect to one of the contacts. Similarly, when yarn is in eye 484, guide 476 tips to the position shown in solid in FIG. 16 with magnet 482 held far enough away from switch 474 so that the contacts of that switch are open. Thus a readily detectable electrical signal results from each ends down condition of the yarn or thread which passes through eye 484.

Figure 18:
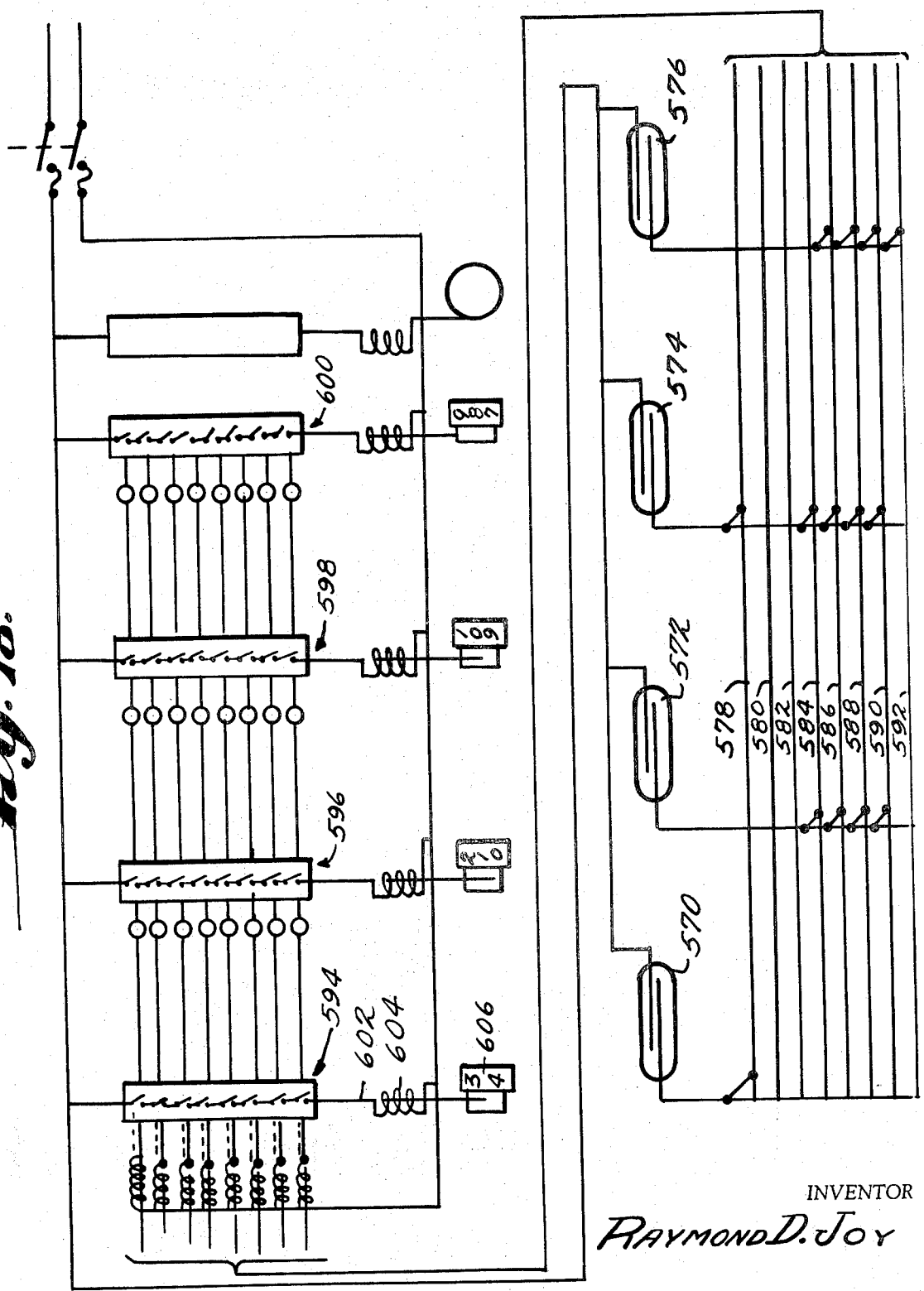
FIG. 18 shows a system for determining which reed switch of a number of reed switches has been closed in response to an ends down condition.

Reference is now made to FIG. 18 which shows a simple logic arrangement for detecting and recording the closing of reed switches such as shown in the embodiment of FIGS. 16 and 17. As discussed above, such units are normally grouped with a large number of other units and, accordingly, it is desirable to be able to monitor the open or closed condition of a large number of such reed switches with a minimum number of lines and electrical equipment. While in FIG. 18 only reed switches 570, 572, 574 and 576 are illustrated, it will be understood that the logic circuit shown in FIG. 18 will normally be used with a large number of such switches. The eight-line detection system shown in FIG. 18 will, of course, be capable of handling 255 switches and the system can easily be expanded by simply adding additional lines.

In the embodiment of FIG. 18, each of the reed switches in the system is assigned a unique binary number and is connected to a unique combination of the eight output lines 578, 580, 582, 584, 586, 588, 590 and 592 which represents that binary number. A number of logic units equal to the number of reed switches served by the system are connected to lines 580, 582, 584, 586, 588, 590 and 592 for recording the detected conditions of each of the various reed switches. Four units 594, 596, 598 and 600, associated respectively with switches 570, 572, 574 and 576, are shown in FIG. 18.

Each of these logic units responds only to the closing of its associated reed switch which connects a source of voltage of its unique combination of lines. For example, a relay connected to each of the lines, as shown. Relays associated with lines to which the associated switch is connected control normally open switches while relays connected to lines which the associated switch is not connected control normally closed switches, as shown. Thus, a recognition signal is produced on line 602 and passed through a coil of relay 604 only when line 578 is connected to the source of voltage and none of the other lines are so connected, because only under these conditions are all of the switches associated with the relays closed. The passage of current through relay coil 604 causes a recorder, such as ratchet wheel 606, to record the detection of an ends down condition by switch 570. Similarly, units 596, 598 and 600 have relays similarly connected to all of the lines which have normally open and normally closed switches so that a signal is recorded whenever the unique combination of lines indentifying that switch and that combination only is connected to the voltage source by the associated reed switch. The detection of an ends down does not usually occur often enough to cause substantial confusion by the closing of different switches at the same time.

Figure 19:
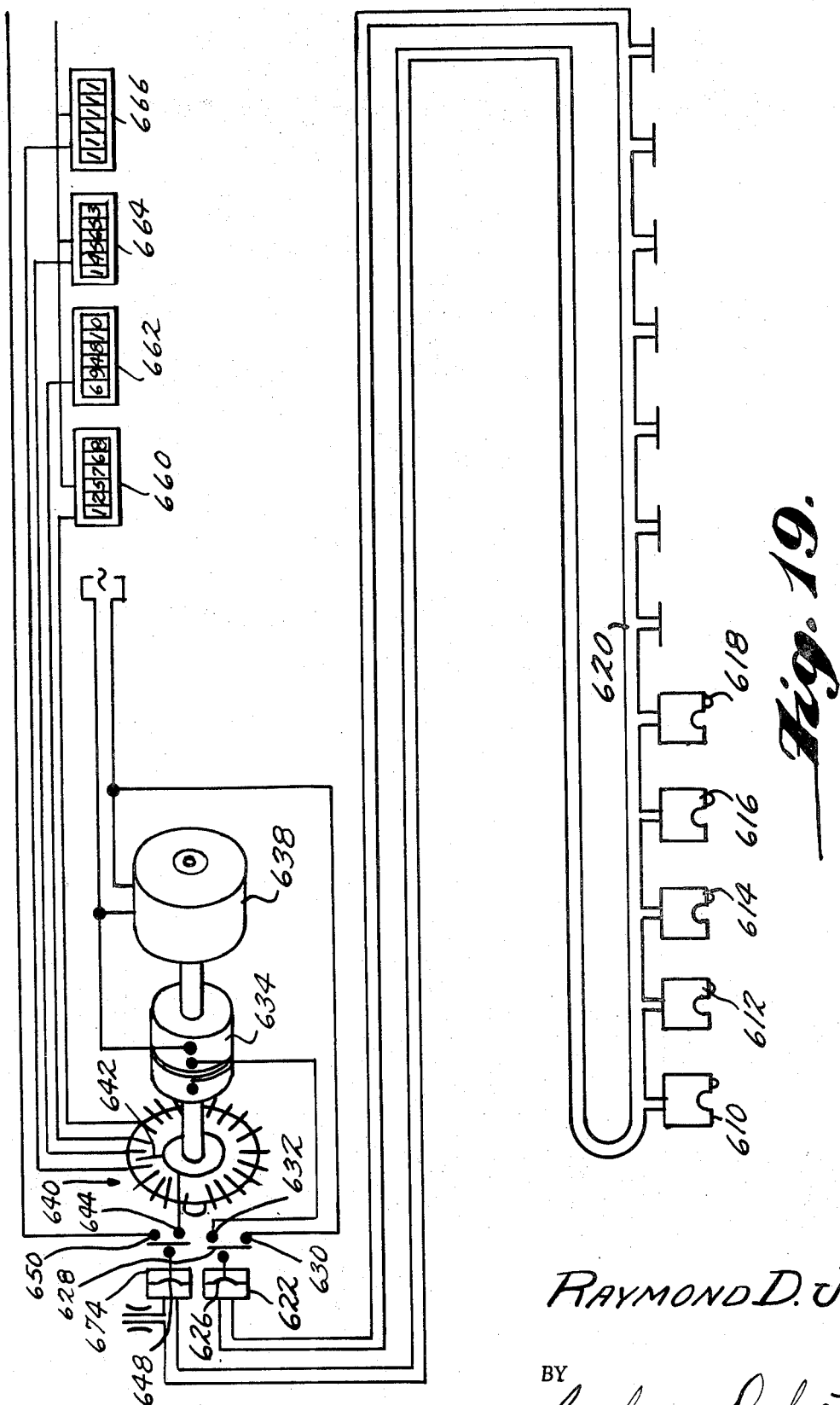
FIG. 19 shows a system for determining which of a number of pneumatic detectors connected to a common manifold has produced a signal in response to the detection of an ends down condition.

FIG. 19 shows a detection system suitable for determining which of a number of individual units connected to a common supply manifold have detected an ends down condition and produced a pneumatic pulse such as in the embodiments of the FIGS. 8 and 9. Five units 610, 612, 614, 616, and 618 are shown connected to a supply manifold 620. These units are preferably the same as shown, for example, in FIG. 9 so that upon occurence of an ends down condition, a pneumatic signal is conveyed to manifold 620 and travels in opposite directions both toward pneumatic devices 622 and toward pneumatic device 624. Since pneumatic device 622 is closer to each of the units 610, 612, 614, 616 and 618 than pneumatic device 624, the pneumatic pulse will arrive there first. The arriving pulse causes a flexible diaphragm 626 in device 622 to move a contact 628 into connection with two contacts 630 and 632 thus completing a current path through a conventional electrical clutch 634 which engages a motor 638 to a contact wheel 640 for a single turn of wheel 640. Wheel 640 is provided with a contact 642 which extends beyond the periphery of wheel 640 and connects in turn to a number of output lines of which four are illustrated in FIG. 19, each representing one detection unit on manifold 620. It will, of course, be understood that one such line will be provided for each unit which is in the system.

Extending contact 642 is electrically connected to contact 644 which is closed by the movement of flexible diaphragm 648 of pneumatic device 624 upon arrival of the pneumatic pulse in manifold 620 at device 624. The arriving pulse thus closes the connection between electrical contact 644 and 650 and completes a momentary current path through the recorder 660, 662, 664 or 666 which is associated with the unit which produced the pneumatic pulse. The distances which a pneumatic pulse travels from the location where each of the various units is connected to supply manifold 620 to devices 622 and 624 are different and accordingly the angular position of wheel 640 at the time that contacts 644 and 650 are connected together is different for each unit.

Figure 20:
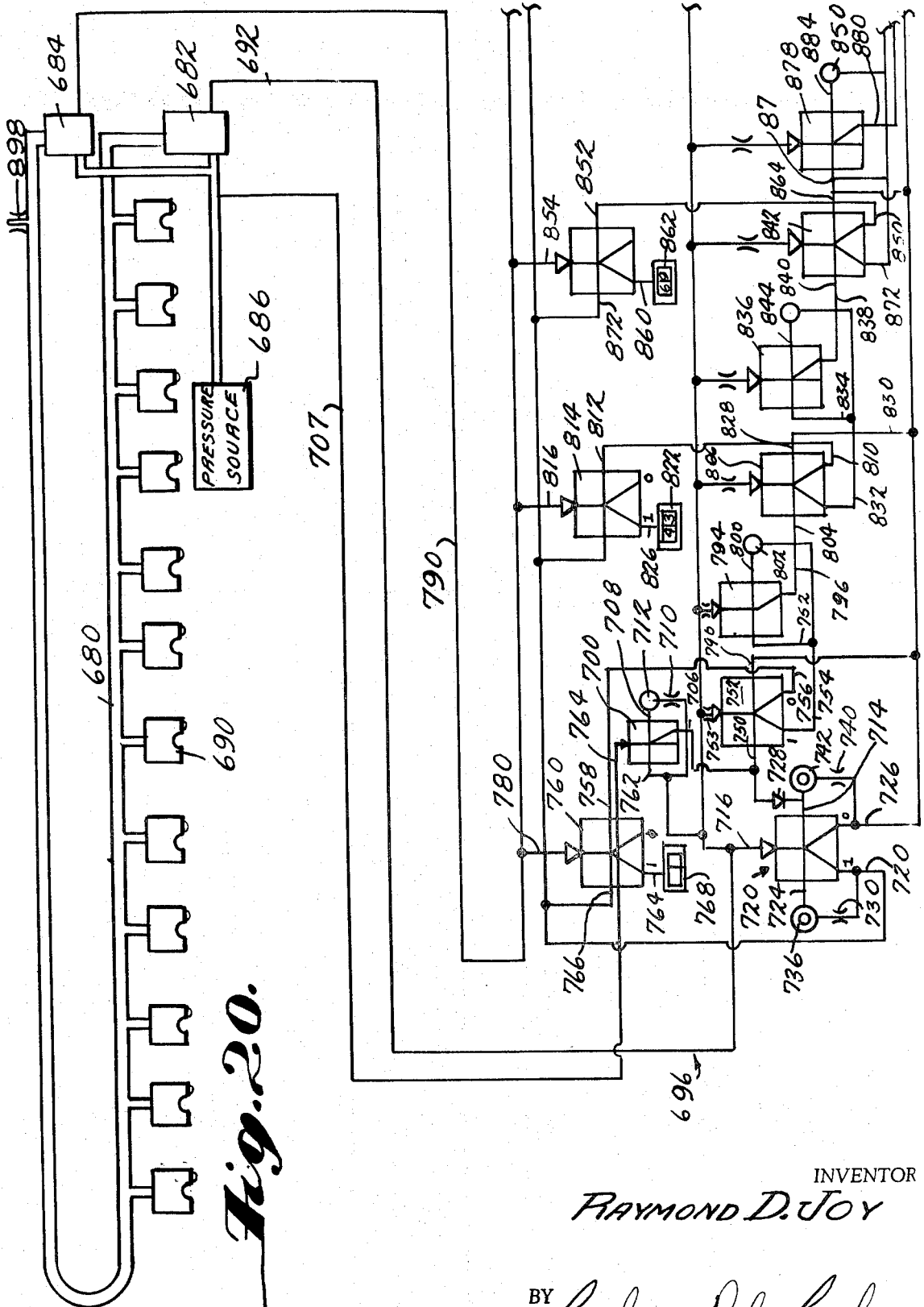
FIG. 20 shows another system for determining which of a number of pneumatic detectors connected to a common manifold has produced a signal in response to the detection on an ends down condition.

Reference is now made to FIG. 20 which shows another arrangement similar to that of FIG. 19 for recording which of a number of units connected to a common supply manifold has produced a pneumatic pulse indicating a detected ends down condition at that particular unit. As in the embodiment of FIG. 19, a plurality of detector units are connected in common to a supply manifold 680 which terminates at one end in a conventional pneumatic amplifier 682 and at the other end in another conventional amplifier 684. Amplifiers 682 and 684 are connected to a source of pressure 686 by a suitable line as shown, and these amplifiers may be of the type shown in FIGS. 10 and 11. Thus, a pulse produced by one of the units, for example, unit 690, is transmitted in both directions in supply manifold 680 and arrives first at amplifier 682, which responds by producing an output on line 692 which is conveyed as shown to the logic generally indicated as 696, and thereafter arrives at amplifier 684, which similarly produces an output on line 790 which is also conveyed to logic 696.

The pneumatic signal produced by amplifier 682 is first conveyed to the left-hand input of pneumatic NOR gate 700 which is a type of logic device which is well known. Briefly, the application of a pneumatic pulse to the left-hand input 702 of NOR gate 700, while a source of pressure is being applied to main input 704, causes the air entering gate 700 through input 704 to be deflected out the 0 output 706. Similarly, signal applied to right-hand input 708, while air is being applied to main input 704, cuts off the flow of air from output 706 remains cut off until that other signal is applied to left-hand input 702. A signal applied to input 702 when output 706 is open has no effect and similarly a signal applied to right-hand input 708 when output 706 is closed has no effect.

Thus, the reception of the pneumatic pulse by amplifier 682 and the production thereafter of an amplified pneumatic signal on line 692 results in the application to left-hand input 702 of a pneumatic signal which causes NOR gate 700 to generate a pneumatic signal at output 706, since main input 704 is connected to source 687 via line 707. The same signal which is applied to left-hand input 702 also is applied to right-hand input 708 via restrictor 710 and pneumatic capacitor 712 so that, after a short period has elapsed following the application of a signal to left-hand input 702, a signal is applied to right-hand input 708 which causes the signal produced at output 706 to end and the NOR gate 700 to remain shut off until the signal on line 692 is removed and a new signal applied to left-hand input 702. Referring to FIG. 21 of the drawings which depicts the operation of the various elements in logic 696, the depicted signal from amplifier 682 causes NOR gate 700 to shift from its 1 condition in which there is no signal at output 706 to its 0 condition in which a signal is produced at output 706. After a short time, as determined by the capacitance of the pneumatic capacitor 712, has elaspsed NOR gate 700 reverts to its 1 condition and remains in that condition for the remainder of the cycle.

The pneumatic signal produced at output 706 is applied to right-hand input 714 of oscillator 720, and the output of amplifier 682 on line 692 is similarly applied to main input 716 of oscillator 720. Oscillator 720 operates similarly to NOR gate 700 in that the application of a pneumatic pulse to its right-hand input 714, when a signal is being applied to main input 716, causes a signal to be produced at its left-hand or 1 output 720, and no signal on right-hand output 726, while the application of a pneumatic signal to be produced on right-hand output 726 and no signal on right-hand output 720. The application of a pneumatic signal to right-hand input 714 while a signal is being produced at left-hand output 720 or the application of a signal to left-hand input 724 while a signal is being produced at right-hand output 726 has no effect. Outputs 720 and 726 are exclusive, i.e. either one or the other, but not both, will at all times have an output signal when a suitable signal is being applied to main input 716.

Thus, the receipt of a pneumatic signal on input 714 causes oscillator 720 to shift, as shown in FIG. 21, from its 0 to its 1 condition so that a pneumatic signal is produced at left-hand output 720, but no signal is produced at right-hand output 726. As shown, the signal produced at left-hand output 720 is applied to left-hand input 724 via restrictor 730 and capacitor 736 so that, after a given time has passed as determined by the capacitance of pneumatic capacitor 736, the signal thus applied to input 724 causes oscillator 720 to shift its condition so that a signal is produced at right-hand output 726 instead of left-hand output 720. The production of a signal at right-hand output 726 causes a signal to be applied to right-hand input 714 via restrictor 740 and pneumatic capacitor 742 so that after a given period of time, as determined by the capacitance of the capacitor 742, has elapsed, oscillator 720 again shifts its condition and this shifting between the 1 and 0 outputs continues as shown in FIG. 21 until the cycle ends.

The short pneumatic signal produced at output 706 of NOR gate 700 is also applied to left-hand input 750 of logic gate 752. Gate 752 which has its main input 753 connected to line 692 responds to the application of the signal to left-hand input 750 by ending the pneumatic signal being produced on left-hand output 754 and instead producing a signal on right-hand output 756. The signal produced at output 756 is applied to right-hand input 758 of gate 760 which then shifts its output signal, as shown in FIG. 21, from unused right-hand output 762 to left-hand output 764 which, as shown, is connected to a conventional pneumatic recorder such as one of those described above. Thus, if a signal is applied to main input 780 of AND gate 760, indicating receipt of the pneumatic signal by amplifier 684, while a signal is being applied to input 758 and before a signal is applied to right-hand input 766, a signal will be recorded which indicates that the sensing device associated with recorder 768 is the one which is signalling detection of an ends down condition. Main input 780 to gate 760 is connected to line 790 which is in turn connected to amplifier so that a signal is produced on line 790 and conveyed to main input 780 whenever the signal from the unit 690 which is detecting an ends down condition is received by amplifier 684.

When oscillator 720 shifts from its 1 to its 0 condition so that a signal is produced at output 726, this signal is applied to right-hand input 790 of gate 752 so that the pneumatic signal being produced at right-hand output 756 thereafter ceases and a signal is instead produced at left-hand outputs 754. The cessation of the signal at right-hand output 790 ends the signal applied to the left-hand input 758 of gate 760, so that gate 760 thereafter returns to its 0 condition, as shown in FIG. 21, when oscillator 720 shifts back to its 1 condition and applies a signal to left-hand input 766. Further, the signal produced at left-hand output 754 is conveyed to left-hand input 792 of NOR gate 794 so that NOR gate 794 produces a signal at its right-hand output 796. The signal produced on left-hand output 754 is also applied to right-hand input 800 of NOR gate 794 via pneumatic capacitor 802 so that, after a short time has elapsed, as determined by the capacitance of pneumatic capacitor 802, NOR gate 794 shifts from its 0 to its 1 condition with the result that the signal being produced at output 796 ceases.

However, the signal produced at output 796, while it persists, is applied to left-hand input 804 of gate 806 of the second stage of logic 696. The first stage, which is comprised of gate 752 and NOR gate 794, is deactivated after gate 794 shifts back to its 1 condition during the interval that gate 752 was in its 0 condition and accordingly gate 760 was in its 1 condition with left-hand output 764 connected to recorder 768, the unit 690 which has detected an ends down condition is not the unit associated with recorder 768.

The pneumatic signal applied to left-hand input 804 of gate 806 causes gate 806 to shift from its 1 to its 0 condition producing a signal on right-hand output 810 which is applied to the right-hand input 812 of gate 814 to cause gate 814 to shift from its 0 to its 1 condition so that, if a signal is applied to main input 816 via line 790 during the time gate 814 is in its 1 condition, that signal will appear at the left-hand output 820 and be applied to conventional pneumatic recorder 822 to record the occurrence of an ends down condition at the unit associated with recorder 822. Thereafter, as the oscillator 720 again shifts from its 1 to its 0 condition so that a signal is produced on right-hand output 726, this signal is conveyed to the right-hand input 828 of gate 806 via line 830 so that AND gate 806 now shifts from its 0 to its 1 condition, producing a pneumatic output signal at left-hand output 832 which is applied to the left-hand input 834 of NOR gate 836 as shown. NOR gate 836 now shifts from its 1 to its 0 condition producing an output signal at its right-hand output 838 which is applied to the left-hand input 840 of the gate 842 which is in the third stage of logic 696. Further, the signal produced on left-hand output 832 of gate 806 is applied to right-hand input 844 of NOR gate 836 via capacitor 846, so that, after NOR gate 846 has remained in its 0 condition for a given time, it shifts back to its 1 condition ending the signal being applied to left-hand input 840 of AND gate 842. This deactivates the second stage of logic 696.

The signal received on the left-hand input 840 of gate 842 causes gate 842 to shift from its 1 to its 0 condition so that a signal is produced on right-hand output 850 which is applied to left-hand input 852 of gate 854 which then shifts from its 0 to its 1 condition so that if a signal is applied to main input 854, before a signal is being applied to left-hand input 872, that signal is diverted to left-hand output 860 so that an appropriate signal is recorded by pneumatic recorder 862.

Oscillator 720 now shifts again from its 1 to its 0 condition, as can be seen from the timing chart shown in FIG. 21 with the result that a pneumatic signal is applied to right-hand input 864 of gate 842 so that gate 842 shifts again from its 0 to its 1 condition, ending the pneumatic signal at output 850 and permitting gate 852 to shift from its 1 to its 0 condition when oscillator 720 again shifts from its 0 to its 1 condition and produces a signal at output 720 which is conveyed to the left-hand input 872 of gate 854. When oscillator 720 shifts from its 0 to its 1 condition, a signal is applied to the right-hand input 864 of gate 842 with the result that gate 842 shifts from its 0 to its 1 condition, producing a signal at left-hand ouptut 872 which is conveyed to the left-hand input 874 of NOR gate 878 which then shifts from its 1 to its 0 condition and produces a pneumatic signal on its right-hand output 880 which is conveyed to the AND gate of the next stage in the same fashion as for the three stages illustrated in FIG. 20. The signal produced at left-hand output 872 is also applied to right-hand input 884 of NOR gate 878 via capacitor 890 so that, after a given time, as can be seen from the timing chart in FIG. 21, NOR gate 878 now shifts again from its 0 to its 1 condition, turning off the third stage of the unit. In the chart of FIG. 21, it is assumed that a signal is received on line 790 while gate 854 is in its 1 condition.

Thus, there is a logical progression from stage to stage with the associated AND gate and recorder of each stage being enabled while that state is activated and disabled until the next cycle after the stage is deactivated. The timing of the progression through the various stages is chosen so that a signal from the detecting unit with which each stage is associated will reach amplifier 684 during the time that the stage is enabled and accordingly, the output signal of amplifier 684 on line 790 will be applied to a main input, for example, main input 816 of gate 814, at a time when that gate is shifted to its 1 condition and, accordingly, an appropriate pneumatic signal will be applied to the recorder via the left-hand input.

When the initial pneumatic signal reaches amplifier 684, it immediately begins venting to the atmosphere via restrictor 898 so that shortly thereafter the signal being applied to amplifier 682 and 684 disappears as the pressure in the manifold 680 is vented to the atmosphere. At that time the cycle is complete and the logic is now in readiness to receive a new signal from one of the detectors and to properly record which detector produced the ends down condition signal.

FIG. 22 shows an embodiment of the invention similar to that of FIG. 21 in which a somewhat similar logic network 900 is employed to sequentially activate a number of stages each associated with a detector so that a signal will be received from one amplifier at a time during which the appropriate stage is activated. As in the embodiment of FIG. 22, the production of the pneumatic signal by a detector which is connected to a manifold, such as shown in FIG. 20, first causes a conventional pneumatic amplifier 902 to produce a signal which is passed to trigger NOR gate 904 and to conventional oscillator 906. the oscillator then begins shifting back and forth between its 0 and 1 output states, with each shift causing a separate stage to be activated and deactivated. Thus, the first shift activates stage 910 which is comprised of AND gate 912 and NOR gate 914 which operate in the same fashion as described above. Second stage 916 is comprised of AND gate 920 and NOR gate 922 and these elements also operate in the manner described above. It will be understood that the logic will normally consist of a number of such stages sequentially connected in the manner illustrated in FIG. 20.

However, FIG. 20 illustrates two other ways for recording the signal from amplifier 926, which follow the signal from amplifier 920 by a definite time delay which is a function of which sensor is producing the pneumatic signal. In the first two stages of logic 920 in FIG. 22, a conventional pneumatic amplifier 928 is employed as the device wihch applies a pneumatic signal to conventional pneumatic recorder 930. Line 932, which is connected to the output of conventional pneumatic amplifier 926 is connected to one input of amplifier 926 and the right-hand output of AND gate 912 is similarly connected to the other input so that a signal is produced on output 934 of amplifier 928 only when a signal is present on both line 932 and on line 936. The second stage is similarly provided with an amplifier 938 which has its output connected to a conventional pneumatic recorder 940 and which has two inputs, one connected to line 932 and the other connected to line 942 which is in turn connected to the right-hand output of AND gate 920.

Also connected to line 932 and to the right-hand outputs of AND gates, such as gates 912 and 920, are two pneumatic multi-vibrators 950 and 952. Multi-vibrator 950 has its main input 954 connected to line 932, and its right-hand input 956 connected to line 958 which is in turn connected to right-hand output of an AND gate of the third or further stage. The receipt of a signal at right-hand input 956 causes multi-vibrator 950 to shift from its 0 to its 2 condition so that its signal is produced on output 960 if a signal is being received at main input 954. Similarly, the signal on line 958 is applied to the left-hand input 962 via conventional pneumatic capacitor 964 so that, after a short time delay, multi-vibrator 950 reverts to its 0 condition and a signal will no longer be produced on output 960 if a signal is being received at input 954. Thus, if amplifier 926 produces an output on line 932 indicating the receipt of the pneumatic signal during the time that the one shot multi-vibrator 950 is in its 1 condition, that signal will be recorded on recorder 970. One shot multi-vibrator 952 operates similarly.

Figure 23:
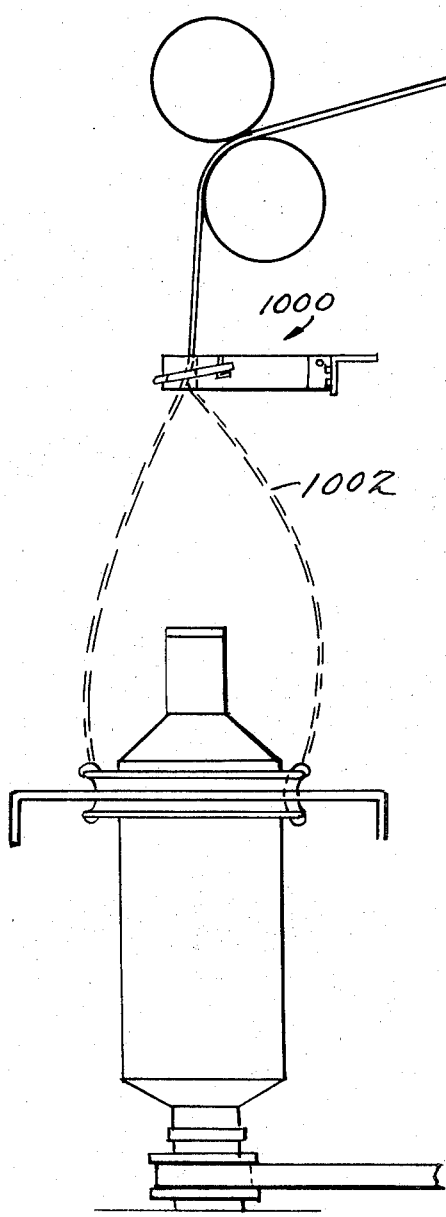
FIG. 23 shows an ends down detector mounted on a spinning frame.

Reference is now made to FIG. 23 which shows a schematic view of one of the detection units 1000 of this invention in place along a spinning frame and with a yarn 1002 associated with it as discussed above.

Many changes and modifications in the above embodiments of the invention are possible without deviating from the scope of that invention. Accordingly, that scope is intended to be limited only by the scope of the appended claims.

What is claimed is:

1. An apparatus for detecting and responding to the absence of a strand of material or the like comprising:
   a housing member having a bore,
   a piston member movable in said bore,
   means for receiving a continuous pneumatic signal,
   means for detecting the absence of said strand, for transmitting said pneumatic signal to an enclosed region at the front of said piston member so that said piston member moves in said bore from a first to a second position when the presence of said strand is detected and for preventing the transmission of said signal to said enclosed region when the absence of said strand is detected,
   means for urging said piston member from said second to said first position so that said piston member returns to said first position whenever the transmission of a signal being transmitted is prevented, and
   a transparent bezel member mounted on the end of said bore so that the front of said piston member is visible through said bezel member when said piston member is in said first position.

2. An apparatus as in claim 1 wherein said receiving means includes a chamber in said housing member, wherein said detecting, transmitting and preventing means includes a passageway in said housing member connecting said chamber to the atmosphere, a valve member having a valve stem for blocking said passageway when said valve member is in a first position and unblocking said passageway when said valve member is in a second position, means engaging said strand and associated with said valve member for causing said valve member to assume said first position when no strand is engaged and said second position when a strand is engaged, and a second passageway is said housing member connecting said chamber to a region at the rear of said piston member and wherein said piston member has a passageway through it connecting said region at its rear to said enclosed region.

3. An apparatus as in claim 2 wherein said receiving means further includes means for restricting flow into said chamber.

4. Apparatus as in claim 1 wherein said urging means includes a spring.

5. Apparatus as in claim 1 wherein the front of said piston member is colored red.

6. Apparatus as in claim 1 wherein said receiving means includes a first chamber in said housing member, wherein said detecting, transmitting and preventing means includes a first passageway in said housing member connecting said chamber to a first chamber open to the atmosphere and a second passageway connecting said second chamber to a region at the rear of said piston member so that said pneumatic signal is transmitted to said rear region when said strand is not disposed in said second chamber and is not transmitted to said rear region when said strand is disposed in said second chamber and wherein said piston member has a passageway through it connecting said rear region to said enclosed region.

7. Apparatus as in claim 6 further including first contact means mounted on said piston member and second contact means disposed in said bore so that an electrical signal is produced by the electrical connection of said first and second contacts when said piston member is in said second position.

8. Apparatus as in claim 7 further including means responsive to the initial production of said electrical signal for recording the detection of the absence of said strand.

9. An apparatus for detecting and responding to the absence of a strand of material or the like comprising:
   a housing member having a bore,
   a piston member movable in said bore,
   means for receiving a continuous pneumatic signal,
   means for detecting the absence of said strand, for transmitting said pneumatic signal to an enclosed region at the front of said piston member so that said piston member moves in said bore from a first to a second position when the presence of said strand is detected and for preventing the transmission of said signal to said enclosed region when the absence of said strand is detected,
   means for urging said piston member from said second to said first position so that said piston member returns to said first position whenever the transmission of a signal being transmitted is prevented, and
   means for producing a pneumatic pulse when said piston member moves from said second to said first position.

10. Apparatus as in claim 9 wherein said piston member has a passage through it for transmitting said pneumatic signal and wherein said producing means includes a second passage from said passage through said member to an opening in said piston member adjacent said bore and a third passage in said housing member opening in said bore so that as said piston member moves from said first to said second position said opening in said piston member is momentarily aligned with said opening of said housing member in said bore to communicate said pneumatic signal to said third passage.

11. A system determining which of a number of pneumatic devices connected to a common manifold has produced a pneumatic signal comprising:
   a number of said pneumatic devices each including:
   a housing member having a bore,
   a piston member movable in said bore,
   means for receiving a continuous pneumatic signal,
   means for detecting the absence of a strand of material, for transmitting said pneumatic signal to an enclosed region at the front of said piston member so that said piston member moves in said bore from a first to a second position when the presence of a strand is detected and for preventing the transmission of said signal to said enclosed region when the absence of said strand is detected, and
   means for urging said piston member from said second to said first position so that said piston member returns to said first position whenever the transmission of a signal being transmitted is prevented;
   a manifold connected to each of said devices so that each said signal produced is transmitted from the location of the producing device both directions in said manifold,
   a first signal detecting device connected to one end of said manifold for producing a first signal upon arrival of said pneumatic signal at said first device,
   a second signal detecting device connected to the other end of said manifold for producing a second signal upon arrival of said pneumatic signal at said second device, and
   means for determining the time interval between the production of said first signal and the production of said second signal and accordingly which of said pneumatic devices produced said pneumatic signal.

12. A system for determining which of a number of reed switches each connected to a unique combination of data lines has changed its position comprising:
   recorder means associated with each said data switch,
   a number of relays associated with each said recorder means and each having a controlled normally open or normally closed switch, each relay being connected to one of said data lines so that when said data switch changes its position all of said controlled switches will be closed,
   means for connecting said recorder means to a source of electrical energy via each of said controlled switches so that said recorder means records a signal when said switch changes position, and
   a pivotable member associated with each reed switch having a magnet mounted on one end and engaging a strand of material on the other end so that when said strand is absent said magnet moves adjacent said reed switch to cause it to close and when said strand is present said magnet moves away from said reed switch so that its contacts open.

* * * * *